United States Patent Office 3,743,701
Patented July 3, 1973

3,743,701
DIAMMONIUM HYDRAZINIUM TETRAPERCHLO-
RATE AND PROCESS OF MAKING
Theodore Chester Crawford, Brigham City, and Verdean
Daugherty, Hyrum, Utah, assignors to Thiokol Chemical Corporation, Bristol, Pa.
Filed Nov. 27, 1968, Ser. No. 779,337
Int. Cl. C01b 11/18, 21/52; C06b 11/00
U.S. Cl. 423—386   10 Claims

ABSTRACT OF THE DISCLOSURE

The novel compound diammonium hydrazinium tetraperchlorate, having the formula $(NH_4)_2N_2H_6(ClO_4)_4$, prepared by reacting hydrazine hydrochloride with anhydrous ammonium perchlorate dissolved in liquid anhydrous hydrogen fluoride at about ambient temperature in a vessel, cooling to precipitate the product crystals, and separating the product crystals from the liquid phase. The product is useful as an oxidizer in rocket propellant compositions and in cured rocket propellants, and as a chemical oxidizing agent.

BACKGROUND OF THE INVENTION (1) Field of the invention

The invention relates to a novel method for preparation of a novel inorganic perchlorate compound having advantageous utility as an oxidizer in rocket propellant compositions and rocket propellants because of its relatively low hygroscopicity, good compatibility with polymeric binders, good safety features and high oxidizing capacity.

(2) Description of the prior art

Oxidizers for use in rocket propellant compositions and in rocket propellants are well-known. Among such oxidizers, ammonium perchlorate, $NH_4ClO_4$, and hydrazinium diperchlorate, $N_2H_6(ClO_4)_2$, are especially important and widely known. Ammonium perchlorate, however, produces a lower specific impulse than does $$N_2H_6(ClO_4)_2.$$

On the other hand, $N_2H_6(ClO_4)_2$ produces a higher specific impulse than does $NH_4ClO_4$, but is very hygroscopic and difficult to handle in compounding and in storage in the presence of humidity even as low as about 5% relative humidity.

Methods for manufacturing perchlorate oxidizers are comprehensively described in the American Chemical Society Monograph No. 146, Perchlorates, Their Properties, Manufacture and Uses, edited by Joseph C. Schumacher, Reinhold Publishing Corporation, New York, 1960. Methods for the manufacture of $N_2H_6(ClO_4)_2$ are known in the art.

SUMMARY OF THE INVENTION

The present invention pertains to the novel compound diammonium hydrazinium tetraperchlorate, $$(NH_4)_2N_2H_6(ClO_4)_4.$$

The compound is prepared by reacting one mole of hydrazine hydrochloride with four moles of ammonium perchlorate in at least a solvent amount of anhydrous hydrogen fluoride. The reactions involved in the formation of the novel compound may be expressed as follows:

$$N_2H_5Cl + 2HF \xrightarrow[\text{anhyd. HF}]{\text{Excess}} N_2H_6F_2 + HCl$$

$$N_2H_6F_2 + 4NH_4ClO_4 \xrightarrow[\text{anhyd. HF}]{\text{Excess}} (NH_4)_2N_2H_6(ClO_4)_4 + 2NH_4F$$

$$N_2H_5Cl + 2HF + 4NH_4ClO_4 \xrightarrow[\text{anhyd. HF}]{\text{Excess}}$$
$$(NH_4)_2N_2H_6(ClO_4)_4 + 2NH_4F + HCl$$

On mixing the reactants in the anhydrous hydrogen fluoride (AHF), hydrogen chloride is evolved as a gas and can be recovered as a by-product.

The AHF can be recovered for reuse by evaporating it from the $NH_4F$, which is recovered as a by-product.

The desired product $(NH_4)_2N_2H_6(ClO_4)_4$, is less soluble than $NH_4F$ in anhydrous hydrogen fluoride and precipitates from the latter, leaving the $NH_4F$ in solution when proper concentrations and temperatures are maintained.

Identity of the $(NH_4)_2N_2H_6(ClO_4)_4$ as a novel compound is shown by its chemical analysis, its crystal structure, its X-ray diffraction pattern, its differential thermal analysis curve and its non-hygroscopic and thermal properties.

Rocket propellant compositions prepared using $$(NH_4)_2N_2H_6(ClO_4)_4,$$

hereinafter sometimes referred to as DAHTP, as oxidizer are less hygroscopic than those of $N_2H_6(ClO_4)_2$, and have a higher specific impulse in a cured rocker propellant than does $NH_4ClO_4$. The DAHTP also is compatible with unsaturated hydrocarbon polymer binders in cured rocket propellants.

DESCRIPTION OF THE PREFERRED EMBODIMENTS

Figure 1:
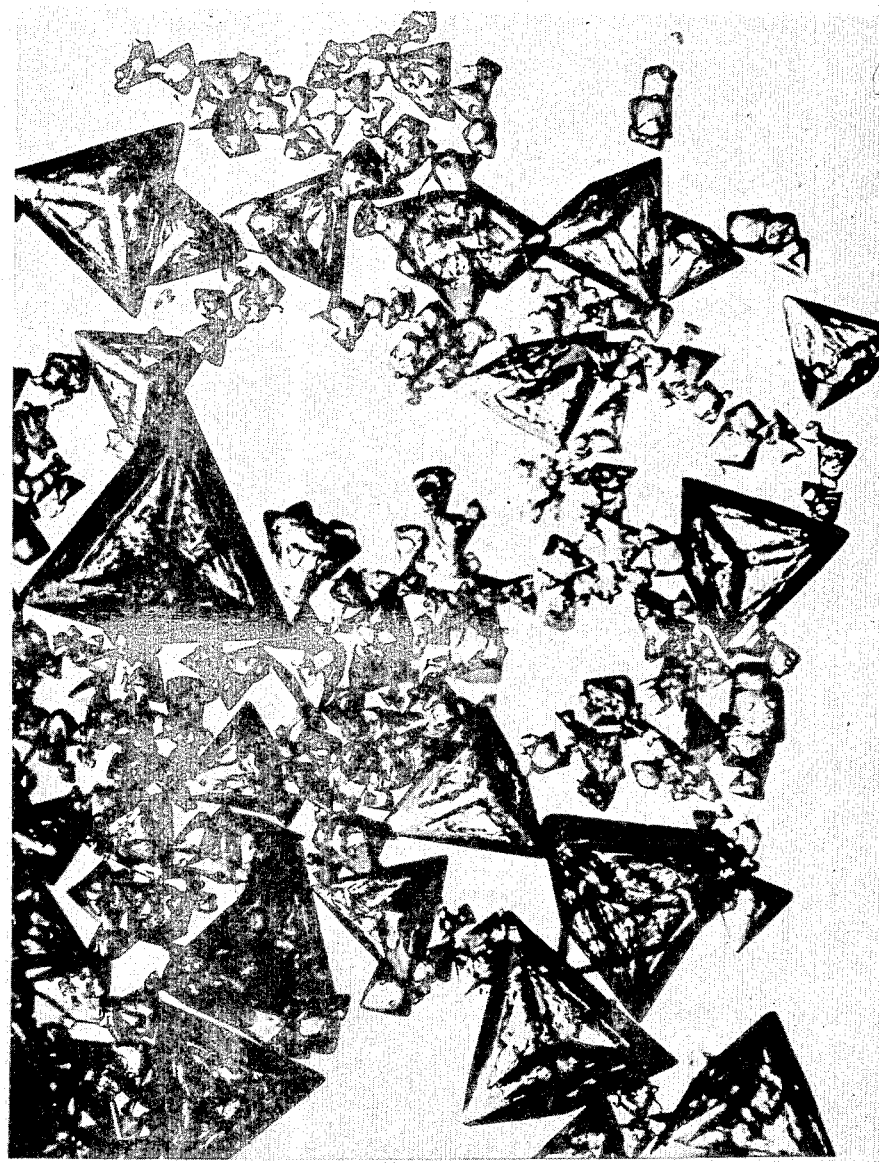
FIG. 1 of the drawing is a photomicrograph, magnification 100×, of crystals of $(NH_4)_2N_2H_6(ClO_4)_4$, showing the tetrahedron forms.

Preparation of diammonium hydrazinium tetraperchlorate, its analysis, its identification as a novel chemical compound and its utility as an oxidizer are described in the following examples.

In the examples, the specifications and the claims, wherever the formula AHF is used, it is to be understood that anhydrous hydrogen fluoride is intended to be used or described.

EXAMPLE 1

An 8 ounce Teflon bottle was used as a reaction vessel. Approximately 120 ml. (119 grams) of anhydrous hydrogen fluoride (AHF) were added to the bottle. 1.0022 grams (0.0146 mole) of hydrazine chloride ($N_2H_5Cl$) and 5.1544 grams (0.0437 mole) of anhydrous ammonium perchlorate ($NH_4ClO_4$) then were introduced into the bottle. Hydrogen chloride gas was evolved. The mixture was stirred and gradually heated to about 40° C. Crystalline product precipitated from the liquid phase. The supernatant liquid anhydrous hydrogen fluoride reaction medium-solvent was decanted from the crystals. The crystals were rinsed with about 20 ml. of AHF. Three grams of crystals were recovered as product. The product was identified as diammonium hydrazinium tetraperchlorate by chemical analysis for its $N_2H_4$, $NH_3$ and $HClO_4$ contents.

Previous studies had indicated the possibility of formation of an addition compound between $NH_4ClO_4$ and $N_2H_6(ClO_4)_2$. Thus, it was possible that the compound obtained might be $NH_4ClO_4$, $N_2H_6(ClO_4)_2$ or $$NH_4N_2H_6(ClO_4)_3$$

Analysis was, therefore, made in accordance with usual practice in analysis of $N_2H_6(ClO_4)_2$ for $N_2H_4$ and $HClO_4$ and for ammonia, ($NH_3$). The results obtained were as follows:

Product of Example 1 (percent): $N_2H_4$, 6.87; $NH_3$, 7.43; $HClO_4$, 85.00.

The above analysis was found consistent with the formula $N_2H_6(ClO_4)_2$, $2NH_4ClO_4$, or $(NH_4)_2N_2H_6(ClO_4)_4$, in which the $N_2H_4$, $NH_3$ and $HClO_4$ are present as follows:

Theoretical product $(NH_4)_2N_2H_6(ClO_4)_4$ (percent): $N_2H_4$, 6.85; $NH_3$, 7.28; $HClO_4$, 85.86.

Thus, it is seen that the actual analysis of the product of the method of Example 1 agrees closely with the theoretical compound $(NH_4)_2N_2H_6(ClO_4)_4$, named diammonium hydrazinium tetraperchlorate (DAHTP).

A series of experimental runs were made to confirm that the same end product, DAHTP, is formed regardless of the ratio of the reactants $NH_4ClO_4$, $N_2H_5Cl$ and AHF used in the method of Example 1. The data for these runs and analytical results for the products are shown in the following examples.

STARTING MATERIALS

| Example number: | $NH_4ClO_4$ (grams) | $N_2H_5Cl$ (grams) | Mole ratio $NH_4ClO_4$: $N_2H_5Cl$ | AHF (grams) |
|---|---|---|---|---|
| 2 | 5.15 | 1.00 | 3:1 | 120 |
| 3 | 13.12 | 2.00 | 3.75:1 | 240 |
| 4 | 15.22 | 2.00 | 4.43:1 | 200 |

ANALYSES OF PRODUCTS

| | Percent of— | | | |
|---|---|---|---|---|
| Example number: | $N_2H_4$ | $NH_3$ | $HClO_4$ | Total |
| 2 | 6.87 | 7.43 | 85.66 | 99.96 |
| 3 | 6.82 | 7.84 | 85.02 | 99.68 |
| 4 | 6.89 | 7.27 | 85.78 | 99.64 |

The data from Examples 2–4 conclusively shows that the varied amounts of starting materials consistently form end-products having the same percent by weight of $N_2H_4$, $NH_3$ and $HClO_4$.

EXAMPLE 5

Eleven batches of $(NH_4)_2N_2H_6(ClO_4)_4$ were prepared by the following procedures:

Fifty-six grams of $NH_4ClO_4$ and 8 grams of $N_2H_5Cl$ were added to a 32 oz. Teflon bottle at about 15° C. 800 ml. of liquid AHF then were added and a few minutes allowed for the evolution and escape of the HCl formed from the reaction of the AHF with the $N_2H_5Cl$.

The Teflon bottle was placed in a metal container and tightly stoppered. This apparatus was attached to a wrist-action shaker in such a manner as to give a gentle stirring motion to the slurry in the bottle. The bottle was lowered into a water bath, the temperature of the water increased to 56° C. and shaking continued until all the solids were in solution. This required approximately 1½ hours. The stirring was continued and the bottle and its contents gradually cooled to −20° C. This cooling cycle lasted approximately three hours. The excess HF was decanted and approximately 20 ml. HF added, stirred, and this, in turn, decanted. The remaining HF was evaporated by warming the bottle. The product crystals were removed and further dried at 60° C. in a vacuum desiccator (house vacuum). The 11 batches prepared as described were blended into one batch (approximately 500 grams). A composite sample was analyzed with the following results:

| | $HClO_4$ (percent) (from $ClO_4$ analysis) | Percent of— | | | |
|---|---|---|---|---|---|
| | | Free $HClO_4$ | $N_2H_4$ | $NH_3$ | F |
| Composite | 85.70 | 21.30 | 6.79 | 7.31 | 0.11 |
| Theoretical | 85.86 | 21.47 | 6.85 | 7.28 | |

Note.—Total=99.91.

It will be noted in the analytical data above that free $HClO_4$ is listed. It is known that when the known compound $N_2H_6(ClO_4)_2$, is placed in an aqueous solution, it will hydrolyze according to the equation:

$$N_2H_6(ClO_4)_2 \xrightarrow{H_2O} N_2H_5^+ + H_3O^+ + 2ClO_4^-$$

Were the compound $(NH_4)_2N_2H_6(ClO_4)_4$ to have the $N_2H_6(ClO_4)_2$ unit as one of its components, the compound should ionize according to the following equation:

$$(NH_4)_2N_2H_6(ClO_4)_4 \xrightarrow{H_2O} N_2H_5^+ + 2NH_4^+ + H_3O^+ + 4ClO_4^-$$

The above equation shows that for each mole of hydrazine there is one $H_3O^+$ liberated. The free $HClO_4$ reported in the above analysis was obtained by titrating an aqueous solution of $(NH_4)_2N_2H_6(ClO_4)_4$ potentiometrically with 0.1 N NaOH and calculating the result as $HClO_4$ present. The result, as noted, above, was 21.30%. The $$21.30\% \times \frac{32.05 \ (N_2H_4)}{100.46 \ (HClO_4)} = 6.79\%$$

or the hydrazine percentage as calculated on the 1:1 basis mentioned above. The percent by weight of hydrazine as determined by a redox method also was 6.79%. This is evidence that a unit of $N_2H_6(ClO_4)_2$ is present in the $(NH_4)_2N_2H_6(ClO_4)_4$ molecule. From these data, it can be theorized that the novel compound of this invention is made up of one mole of $N_2H_6(ClO_4)_2$ chemically united with two moles of $NH_4ClO_4$. Thus the novel compound might be written in the form of an adduct as follows:

$$N_2H_6(ClO_4)_2 \cdot 2NH_4ClO_4$$

However, subsequent analysis of the crystalline product by a variety of physical test methods leads to the conclusion that the novel crystalline material is a chemical compound rather than a simple adduct.

Crystalline product prepared according to the method of Example 5 was examined for its chemical constituents on the theoretical basis that the crystals possibly were a mixture of ammonium perchlorate ($NH_4ClO_4$), and of hydrazinium diperchlorate $N_2H_6(ClO_4)_2$. However, microscopic examination of crystals of the product showed that neither crystals of $NH_4ClO_4$ nor of $$N_2H_6(ClO_4)_2$$

were present. Crystals of $NH_4ClO_4$ and of $N_2H_6(ClO_4)_2$ recrystallized from AHF each show birefringence when observed with a polarizing microscope. Crystals of the crystalline product of Example 1 were found to show no birefringence. Photomicrographs of recrystallized $N_2H_6(ClO_4)_2$, $NH_4ClO_4$ and the crystalline product of the invention show that the novel product crystals are different in form from those of either $N_2H_4(ClO_4)_2$ or $NH_4ClO_4$. The crystals of the novel product are tetrahedrons as shown in FIG. 1 of the drawing. Their crystal density is 2.08 gms./cc.

Figure 2:
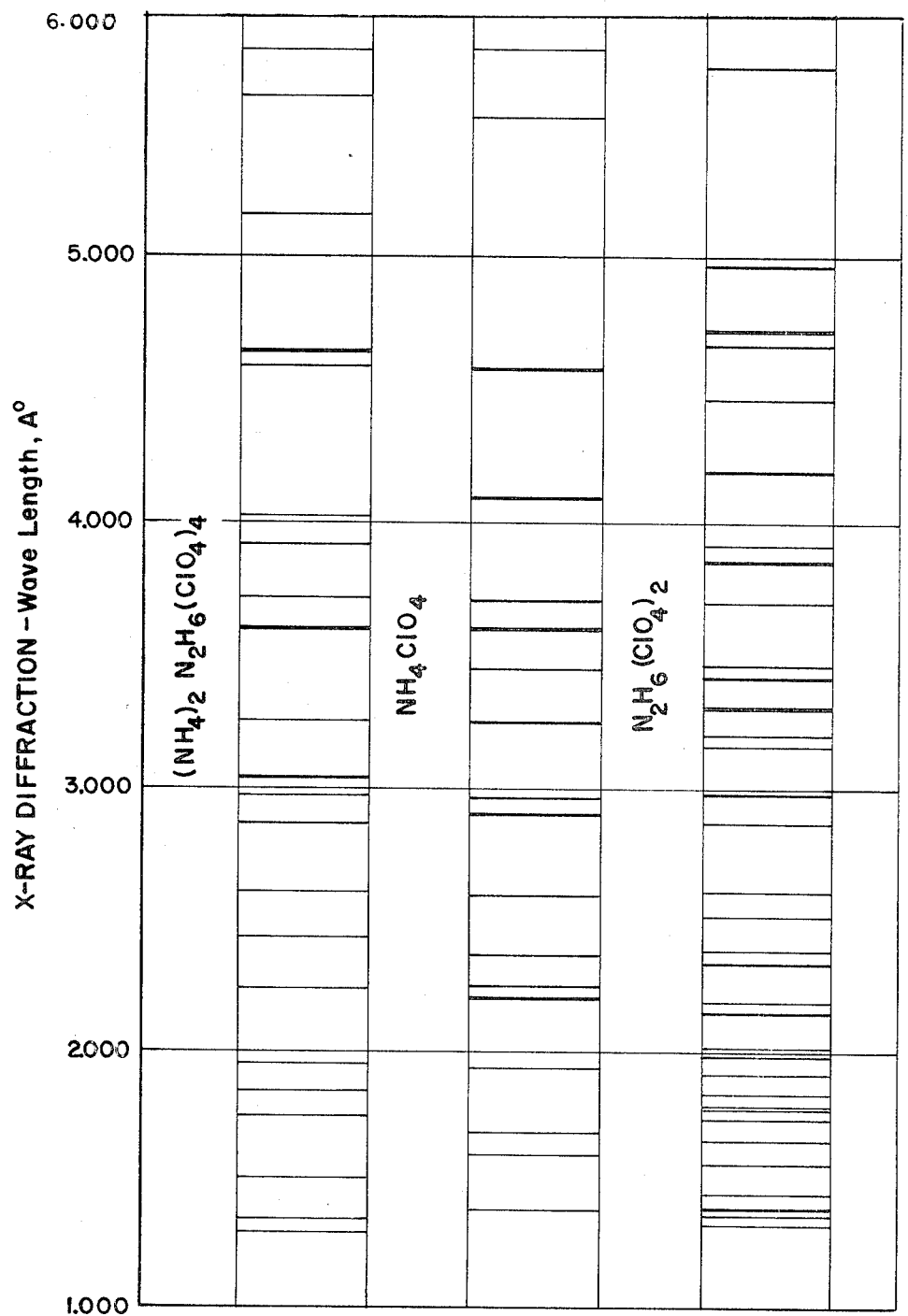
FIG. 2 of the drawing is a reproduction of the X-ray diffraction pattern of $(NH_4)_2N_2H_6(ClO_4)_4$, and shows strong diffraction peaks at $d=4.63$ angstrom units and at $d=3.038$ angstroms. The X-ray diffraction patterns of $NH_4ClO_4$ and $N_2H_6(ClO_4)_2$ are shown for comparison.

Further evidence that $(NH_4)_2N_2H_6(ClO_4)_4$ is a compound is found in examination of its X-ray diffraction pattern, shown in FIG. 2 of the drawing. The X-ray diffraction pattern of the novel crystalline product is found to have strong diffraction peaks at $d=4.63$ angstrom units and $d=3.038$ angstroms. Neither $NH_4ClO_4$ nor $$N_2H_6(ClO_4)_2$$

has these peaks. Thus, the $NH_4ClO_4$ has diffraction peaks at $d=4.08$ and 5.282 angstroms, and $N_2H_6(ClO_4)_2$ has diffraction peaks at $d = 5.705$, 4.711, 3.409, 3.186, 3.138 and 2.976 angstroms. Peaks of $NH_4ClO_4$ and of $$N_2H_6(ClO_4)_2$$

were not found in the novel crystalline product, $$(NH_4)_2N_2H_4(ClO_4)_4$$

Still further evidence of compound entity is found in examination of data from differential thermal analysis of the novel crystalline product. Differential thermal analysis curves were obtained of $NH_4ClO_4$, $N_2H_6(ClO_4)_2$ and of the novel crystalline product. Melting is an endothermic reaction and decomposition is an exothermic reaction. The endotherm of the $NH_4ClO_4$ curve is caused by crystal transition from orthorhombic to cubic crystal form. This endotherm is found in the curve for $NH_4ClO_4$ but is not present in the curve for the novel crystalline product. The curve for $N_2H_6(ClO_4)_2$ is a curve of an irregular and relatively slow exotherm believed to be caused by the closely associated melting and decomposition points of the compound. The curve for the novel crystalline product, $(NH_4)_2N_2H_4(ClO_4)_4$, is a rapid, smooth exotherm indicative of a sharp decomposition point of a true compound. Observations of crystals of the novel product on a Fisher-Johns melting point apparatus show that decomposition of the product takes place directly from the solid state.

Other physical characteristics of the novel product also support its identity as a compound. The heat of combustion of the novel compound is −2.30 Kcal./gm. In contrast, the heat of combustion for ammonium perchlorate is −2.11 Kcal./gm., and for hydrazinium diperchlorate it is −2.46 Kcal./gm. This fact, too, shows that the novel compound is not a mixture of two moles of $NH_4ClO_4$ with one mole of $N_2H_6(ClO_4)_2$, which would have an average heat of combustion of −2.2266 Kcal./gm.

It was also theorized that if $N_2H_6(ClO_4)_2$ were present in the novel product as an adduct or mixture, the product should have a hygroscopicity similar to that of $$N_2H_6(ClO_4)_2$$

To determine the relative rate of moisture pick-up of $(NH_4)_2N_2H_6(ClO_4)_4$ in comparison to water pick-up rates for $NH_4ClO_4$, $N_2H_6(ClO_4)_2$ and of a mixture of $$N_2H_6(ClO_4)_2$$

with $NH_4ClO_4$, 40 mg. portions of each material were placed in a weighing pan of a balance in a less than 20% relative humidity atmosphere. The $N_2H_6(ClO_4)_2$ showed a 1% increase in weight in a 12 minute exposure period. The $NH_4ClO_4$ and $(NH_4)_2N_2H_6(ClO_4)_4$ samples showed no significant increase in weight in the same period. The mixture of $NH_4ClO_4$ with $N_2H_6(ClO_4)_2$, however, showed a rapid moisture pick-up. These results further show that $(NH_4)_2N_2H_6(ClO_4)_4$ is not a physical mixture of $$NH_4ClO_4$$

and $N_2H_6(ClO_4)_2$. It was found, also, that over a much longer period of time the $(NH_4)_2N_2H_6(ClO_4)_4$ will pick up sufficient water at relative humidity over 15% to form a dihydrate.

Based on all the above factual evidence the novel product of the invention is identified as diammonium hydrazinium tetraperchlorate having the formula $$(NH_4)_2N_2H_6(ClO_4)_4$$

EXAMPLE 6

The compatibility of $(NH_4)_2N_2H_6(ClO_4)_4$, DAHTP, with a hydrocarbon polymer (HC) binder having unsaturated bonds, a secondary nonallylic hydroxyl terminated polybutadiene polymer, was determined as follows:

A small amount (50–100 mg.) of DAHTP was mixed with approximately 1 gm. of the HC binder on a spot plate in a nitrogen-flushed drybox and the mixture allowed to stand at room temperature in a desiccator. No discoloration or gassing was observed during a two-day test period. These results indicate that the DAHTP is compatible with HC binder for use in a rocket propellant composition.

Similar tests were conducted with aluminum powder, used as a metal fuel in a rocket propellant composition, and with MAPS curing agent with similar good results. MAPS is a well-known curing agent, tris(1,2-methyl) aziridinyl phosphine sulfide.

The novel $(NH_4)_2N_2H_6(ClO_4)_4$ is useful as an oxidizer in rocket propellant compositions and in cured rocket propellants. An oxidizer for such purposes must be compatible with other ingredients which are present in the propellant composition and with the materials with which the composition come into contact during mixing, handling, curing and storage. $(NH_4)_2N_2H_6(ClO_4)_4$ also has utility as a source of perchlorate ions in chemical reactions as will be obvious to a chemist.

EXAMPLE 7

The curing of a rocket propellant composition containing $(NH_4)_2N_2H_6(ClO_4)_4$, DAHTP, oxidizer with HC binder and aluminum metal fuel and curing agents was determined by mixing and curing a mixture of these ingredients in a known manner in the following proportions:

| Ingredient: | Parts |
|---|---|
| DAHTP | 67.0 |
| HC binder * | 14.25 |
| Aluminum powder | 16.0 |
| MAPS * | 1.75 |
| ZnO | 1.0 |
| Total | 100.00 |

*See Example 6 for definition.

The cured propellant was found to have good tensile strength and flex, favorably comparable to those of $NH_4ClO_4$ oxidizer propellant. Its maximum stress was 304 p.s.i.; its strain at maximum stress was 0.22 inch/inch; and its modulus was 2120 p.s.i. The rocket propellant was fired and was found to have a burning rate of 0.88 inch/sec. at 1000 p.s.i. and a burning rate to pressure slope of 0.42. An 86% solids in HC loading to 20 parts of aluminum fuel gave a specific impulse of 266.9 lb. sec. per lb.

EXAMPLE 8

Safe use suitabilities of $(NH_4)_2N_2H_6(ClO_4)_4$, DAHTP, as oxidizer and of cured rocket propellant containing DAHTP oxidizer are shown by the data listed in Tables I and II. The data are all within acceptable safety standards used in the field of rocket propellants.

TABLE I

| Safety tests: | DAHTP oxidizer |
|---|---|
| Impact at 50% (in.) | 16 |
| Friction at 50% (lb.) | 34 |
| Electrostatic, unconfined, (joules at 0.01 mfd.) | 8 |
| Autoignition, oven (hrs.) at 275° F. | 24 |

TABLE II

| Safety tests: | DAHTP propellant |
|---|---|
| Impact at 50% (in.) | 7 |
| Friction at 50% (lb.) | 37 |
| Electrostatic, unconfined (joules at 0.01 mfd.) | 8 |
| Autoignition, oven (hrs.): | |
| At 300° F. | 24 |
| At 225° F. | 24 |

It will be understood by those skilled in the chemical and rocket propellant arts that modifications can be made in the method of preparing $(NH_4)_2N_2H_6(ClO_4)_4$ and in formulating propellant compositions wherein it is used as an oxidizer.

Thus, in preparing $(NH_4)_2N_2H_6(ClO_4)_4$, while $N_2H_5Cl$ has been shown by way of example of a hydrazinium halide, other hydrazinium halides can be used, for example, $N_2H_5F$.

The molar proportion of hydrazinium halide to $NH_4ClO_4$ which is used will theoretically be in the ratio of 1:4. However, an excess of either reactant may be used and stoichiometric amounts will react, leaving unreacted amounts of either reactant dissolved in the anhydrous hydrogen fluoride reaction medium-solvent. An excess of 2 to 5% of hydrazinium halide, e.g. $N_2H_5Cl$, is preferably used.

The amount of anhydrous hydrogen fluoride used should be a stoichiometric amount plus at least a solvent amount by weight. Preferably, the total amount will range from about 10 to 30 times the total weight of the $NH_4ClO_4$ plus the hydrazinium halide reactant.

Temperature is not critical and will usually range from about 60–70° F., i.e., close to or below, the boiling point of anhydrous hydrogen fluoride, although higher or lower temperatures can be used without affecting the reaction adversely.

Pressure is not critical and any pressure may be used from sub- through superatmospheric. Preferably, pressure conditions existing in a closed vessel or in a vented vessel equipped with a suitably cooled reflux column will be advantageously used with ambient temperatures in the vessel.

Use of anhydrous hydrogen fluoride as a solvent as well as a reaction medium is particularly advantageous in that the by-product ammonium halide formed can be separated easily from the solution by boiling off the excess AHF at a relatively low temperature. The recovered AHF can be reused in further cycles of the process.

The intermediate reaction product, $N_2H_6F_2$, can be prepared in the AHF solution separately in the absence of the $NH_4ClO_4$ and mixed with the $NH_4ClO_4$ substantially as described in Example 6. This feature of the process is advantageous for practice of the process as a continuous process. For example, a stream of $$NH_4ClO_4\text{-}AHF$$

solution can be continuously blended and reacted with a stream of $AHF\text{-}N_2H_6F_2$ solution in a pipe-type reactor, passing the reaction mass through an evaporator to remove part of the AHF vapors and to concentrate the mass, passing the concentrated mass into a crystallizer, emptying the crystallizer product into a separator means in the form of a continuous filter bed or centrifuge, drying and storing the $(NH_x)_2N_2H_6(ClO_4)_4$ product crystals, passing the $NH_4F$-containing AHF solution into an evaporator for recovery of AHF as liquid or vapors and $NH_4F$ as crystalline by-product, and recycling the AHF to the make-up station for preparing the starting reactant solutions.

The crystalline $(NH_4)_2N_2H_6(ClO_4)_4$ can be grown to a desired particle size satisfactory for use as an oxidizer in a propellant composition, e.g. from about 16 microns to about 400 microns.

The formulation of incendiary and other pyrotechnic compositions using $(NH_4)_2N_2H_6(ClO_4)_4$ oxidizer will be obvious to one skilled in the art, requiring only substitution of a stoichiometrically equivalent amount of $$(NH_4)_2N_2H_6(ClO_4)_4$$

for a known oxidizer such as $NH_4ClO_4$ or lead dioxide. Thus, a major amount, e.g., 70–80 parts of $$(NH_4)_2N_2H_6(ClO_4)_4$$

are mixed with 5–15 parts by weight of aluminum powder and 5–15 parts of polytetrafluoroethylene powder and pressed into an igniter tube or into pellets in the manner taught in general in U.S. 3,198,678, "Pyrotechnic Compositions." On ignition with heat or an electrical spark, the incendiary composition will burn rapidly.

The formulation of $(NH_4)_2N_2H_6(ClO_4)_4$ with polymeric fuels and with metal fuels into rocket propellant compositions can be carried out by substituting $$(NH_4)_2N_2H_6(ClO_4)_4$$

for a previously used oxidizer, e.g., $NH_4ClO_4$, while retaining all the benefits and advantages of $$(NH_4)_2N_2H_6(ClO_4)_4$$

In such formulations, the oxidizer and fuels will be present in proportions effective for efficient combustion of the composition to create thrust in a rocket.

The selection of various binders and curing agents for binding and curing rocket propellant compositions containing $(NH_4)_2N_2H_6(ClO_4)_4$ is within the skill of the art. However, some binders and curing agents are better than others for this purpose. While not intending to limit the invention to the use of any particular binder-curing agent combination, the combinations used in compounding propellant compositions of $NH_4ClO_4$ have been found especially useful and are preferred.

It is to be understood that the examples and descriptions recited herein are by way of disclosing the invention in its preferred embodiments and that modification may be made therein while retaining all or some of the advantages and benefits of this invention, which itself is defined in the following claims.

We claim:

1. $(NH_4)_2N_2H_6(ClO_4)_4$, a compound having a tetrahedron crystalline form an having an X-ray diffraction pattern as shown in FIG. 2.

2. The method for preparation of $(NH_4)_2N_2H_6(ClO_4)_4$ which comprises reacting 4 molar quivalents of $NH_4ClO_4$ with 1 molar equivalent of a hydrazinium halide in at least a solvent amount of liquid anhydrous hydrogen fluoride at a solubilizing temperature, and separating $(NH_4)_2N_2H_6(ClO_4)_4$ from the reaction mass.

3. The method of claim 2 wherein the hydrazinium halide is $N_2H_5Cl$.

4. The method of claim 2 wherein the hydrazinium halide is $N_2H_5F$.

5. The method of claim 2 wherein the selected reactant is $N_2H_6F_2$.

6. The method of claim 2 wherein separating comprises the step of cooling the reaction mass to precipitate $$(NH_4)_2N_2H_6(ClO_4)_4$$

crystals therefrom.

7. The method for preparation of $(NH_4)_2N_2H_6(ClO_4)_4$ which comprises reacting 4 molar equivalents of $NH_4ClO_4$ with about 2% to 5% in excess of 1 molar equivalent of a hydrazinium halide in about 10 to 30 times the weight of $NH_4ClO_4$ and the hydrazinium halide of liquid anhydrous hydrogen fluoride at a solubilizing temperature, and separating $(NH_4)_2N_2H_6(ClO_4)_4$ from the reaction mass.

8. The method of claim 7 wherein the hydrazinium halide is $N_2H_5Cl$.

9. The method of claim 7 wherein the hydrazinium halide is $N_2H_5F$.

10. The method of claim 7 wherein separating comprises the step of cooling the reaction mass to precipitate $(NH_4)_2N_2H_6(ClO_4)_4$ crystals therefrom.

References Cited
UNITED STATES PATENTS

| | | | |
|---|---|---|---|
| 2,768,874 | 10/1956 | Robson | 23—85 |
| 3,138,498 | 6/1964 | Rausch | 23—85 X |
| 3,403,987 | 10/1968 | Kuhn | 23—356 |

MILTON WEISSMAN, Primary Examiner

U.S. Cl. X.R.

149—75, 76